United States Patent
McHugh et al.

(10) Patent No.: US 8,123,171 B2
(45) Date of Patent: Feb. 28, 2012

(54) LOAD ASSISTED RELEASE SYSTEM

(75) Inventors: Charles O. McHugh, Edgewood, FL (US); Scott Hilton, Kissimmee, FL (US); Frank Deazley, Kissimmee, FL (US)

(73) Assignee: S.E., Inc., Orlando, FL (US)

(*) Notice: Subject to any disclaimer, the term of this patent is extended or adjusted under 35 U.S.C. 154(b) by 422 days.

(21) Appl. No.: 12/494,842

(22) Filed: Jun. 30, 2009

(65) Prior Publication Data

US 2010/0001140 A1    Jan. 7, 2010

Related U.S. Application Data

(60) Provisional application No. 61/133,719, filed on Jul. 2, 2008.

(51) Int. Cl.
    *B64D 17/38* (2006.01)
(52) U.S. Cl. ............... 244/151 B; 244/137.3; 244/137.4
(58) Field of Classification Search ............... 244/137.1, 244/137.3, 137.4, 151 B, 151 A, 147; 294/82.25
    See application file for complete search history.

(56) References Cited

U.S. PATENT DOCUMENTS

| | | | |
|---|---|---|---|
| 2,544,399 A | | 3/1944 | Schneider |
| 3,249,328 A | * | 5/1966 | Knowles ................. 244/151 B |
| 3,804,698 A | * | 4/1974 | Kinloch ....................... 428/176 |
| 4,262,865 A | * | 4/1981 | Smith ....................... 244/151 A |
| 5,232,184 A | | 8/1993 | Reuter |
| 6,056,242 A | * | 5/2000 | Collins ................... 244/151 B |
| 6,883,756 B2 | | 4/2005 | Preston |

* cited by examiner

*Primary Examiner* — Timothy D Collins
*Assistant Examiner* — Jamie S Stehle
(74) *Attorney, Agent, or Firm* — Patrick D. Herron, Esq.; Terry M. Sanks, Esq.; Beusse Wolter Sanks Mora & Maire, P.A.

(57) ABSTRACT

A load assisted release system for releasably connecting cargo to a primary delivery vehicle, including a releasable connector and a bridle. The bridle includes a bridle attachment point, a slack loop, a first stage release link connecting a slack loop upper end to a slack loop lower end, and a responsive point in the bridle responsive to a releasing of the first stage release link to cause the releasable connector to release the bridle from the primary delivery vehicle once the first stage release link is released and the responsive point has moved away from the slack loop upper end the second predetermined distance. The releasable connector is configured to connect the bridle to the primary delivery vehicle, and a release force required to move the responsive point in the bridle the second predetermined distance is generated by the cargo as it moves away from the primary delivery vehicle.

17 Claims, 11 Drawing Sheets

BACKSIDE OF 3-D RING
UPPER ATTACHMENT

LOAD ASSISTED RELEASE SYSTEM

CROSS-REFERENCE TO RELATED APPLICATIONS

Applicants claim the benefit of U.S. provisional patent application 61/133,719 filed on Jul. 2, 2008, and incorporated by reference herein.

FIELD OF THE INVENTION

This invention relates to a release system for a suspended load. More particularly, this invention relates to a release system for cargo and its parachute where the release system is effective when under highly dynamic conditions.

BACKGROUND OF THE INVENTION

Several methods for delivering cargo via parachute exist, and generally most involve a primary delivery vehicle, the cargo itself, and a parachute for the cargo. Conventional means of cargo delivery, such as where the primary delivery vehicle is an aircraft and the cargo and cargo parachute are ejected in flight, are effective in many applications, but not all. Hence, other means have been developed, and one technique exists where the primary delivery vehicle is a parachutist wearing a parachute and harness (i.e. the primary delivery vehicle), and cargo is tethered to the primary delivery vehicle via a bridle, to which a cargo parachute container containing a cargo parachute is attached. The bridle, cargo parachute container, cargo parachute, and cargo are known as the cargo bundle.

Using this technique of cargo delivery, cargo can remain tethered to the parachutist until both the cargo and the parachutist reach the ground, or the cargo can be released from the parachutist while both are still in flight, after which the cargo parachute deploys to safely deliver the cargo. Hence, release systems which release the cargo from the parachutist are known in the art. It is also known that parachute operations can occur in a variety of environments under a range of circumstances. Occasionally this results in highly dynamic conditions for the cargo and more importantly, for the primary delivery vehicle, which is often piloted by a human, or, in the case of a parachutist, is a human. In the case where the cargo bundle must be released and the release must be effected by a human, such as where the primary delivery vehicle is a parachutist wearing a tandem parachute harness, the release system must work even when highly dynamic conditions generate increased forces on the release system. Hence, release systems are known that release a parachute or cargo bundle even during dynamic conditions.

A current cargo bundle delivery system employs a parachutist's parachute harness, which also has multiple attachment points for a cargo bundle, known as a tandem parachute harness, the cargo bundle with multiple attachment points for attaching to the tandem parachute harness, and multiple connectors, one for each point of attachment, all of which is piloted by a parachutist.

The connectors in the existing system are three-ring release systems that are known in the art, where the double ring component of the three-ring release system connects to the tandem parachute harness attachment points, and the single ring component is incorporated into the bridle attachment points. A flexible cable is inserted into a release loop of the three-ring release system, which holds the single and double ring components together. When this cable is removed by sliding it axially from the release loop, the single and double ring components separate, and the connection is broken. A separate three-ring release system is used for each point of attachment between the tandem parachute harness and the bridle attachment points.

The manual disconnect system for the above described system contains a handle which is attached to a single cable. This single cable separates into four cables, and each cable is routed to respective attachment points, and serves as the cable that is inserted into the release loop of the three-ring release system. Hence, pulling the release handle will pull all four cables from their respective release loops, which will release the cargo bundle from the harness.

Releasable connectors require an amount of force to effect the release the releasable connector, i.e. a release force. To release the cargo in this human powered release system, the parachutist must generate enough force to overcome frictional forces present on the cable by the release loop and cable housings, generated by the force of the cargo. Hence, reducing friction on the cables is of paramount importance. Further, simultaneous release of the multiple points of attachment is important. Mismatched timing of release and the cargo bundle may not release at every attachment point, possibly changing the configuration of the cargo delivery system, and adding more unpredictability to the situation.

In response to these requirements, the release system of the prior art has used three-ring releases to connect the cargo bundle to the primary delivery vehicle, because they reduce the force that must be applied to the cable in order to release the bundle. The cables have been routed through cable housings which can be bent, but not crushed, in order to provide a low friction path for the cable, and smooth materials for the surface of the cable have been used. To provide for simultaneous release of the connections, the cable housings have been mounted to the bundle in an effort to have them retain their intended routings, and the cables have been cut to appropriate lengths.

Finally, the cargo parachute of the prior art includes a safety cable that prevents the cargo parachute from deploying unless the manual disconnect had been activated. The safety cable has been connected to the manual disconnect handle, and is extracted from a cargo parachute safety loop when the manual disconnect is pulled.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

As the environments and range of circumstances under which tethered cargo bundle systems are being used increases, the conditions under which the release system must release the cargo bundles from the primary delivery vehicle also increase. The inventors have designed an innovative release system that will release the cargo-carrying bundle under a wider range of circumstances than the prior art, including highly unpredictable and dynamically unstable circumstances, and the release of the cargo will be assisted by the forces generated by the cargo. This load assisted release system is accomplished by incorporating the following design aspects.

The various elements that make up the invention will be shown and described in the following paragraphs and figures. An element depicted in more than one place throughout through the drawings will have the same number throughout all of the drawings.

Figure 1:
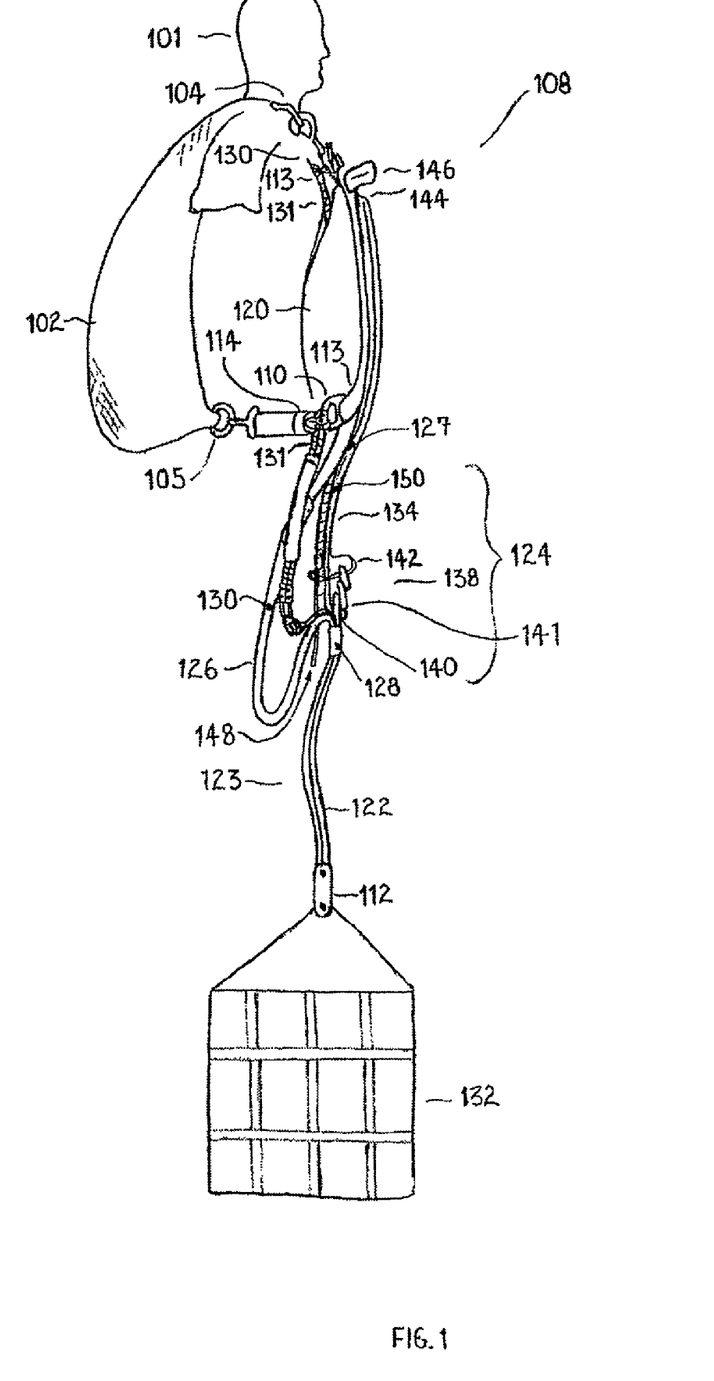
FIG. 1 shows a diagrammatic representation of a side view of an assembled load assist release system, where the first stage release comprises a three-ring release, attached to a parachutist wearing a tandem parachute harness and carrying cargo.

As can be seen in FIG. 1, a cargo bundle 108 contains multiple components (described in further detail below), and the cargo bundle is attached to a primary delivery vehicle at attachment points 104, 105. In this embodiment the primary delivery vehicle is a parachutist 101 wearing a tandem parachute harness 102. The primary delivery vehicle need not be limited to a parachutist wearing a tandem parachute harness, however, and could include anything to which a cargo bundle 108 could be attached, such as a helicopter, or an airplane etc.

Figure 2:
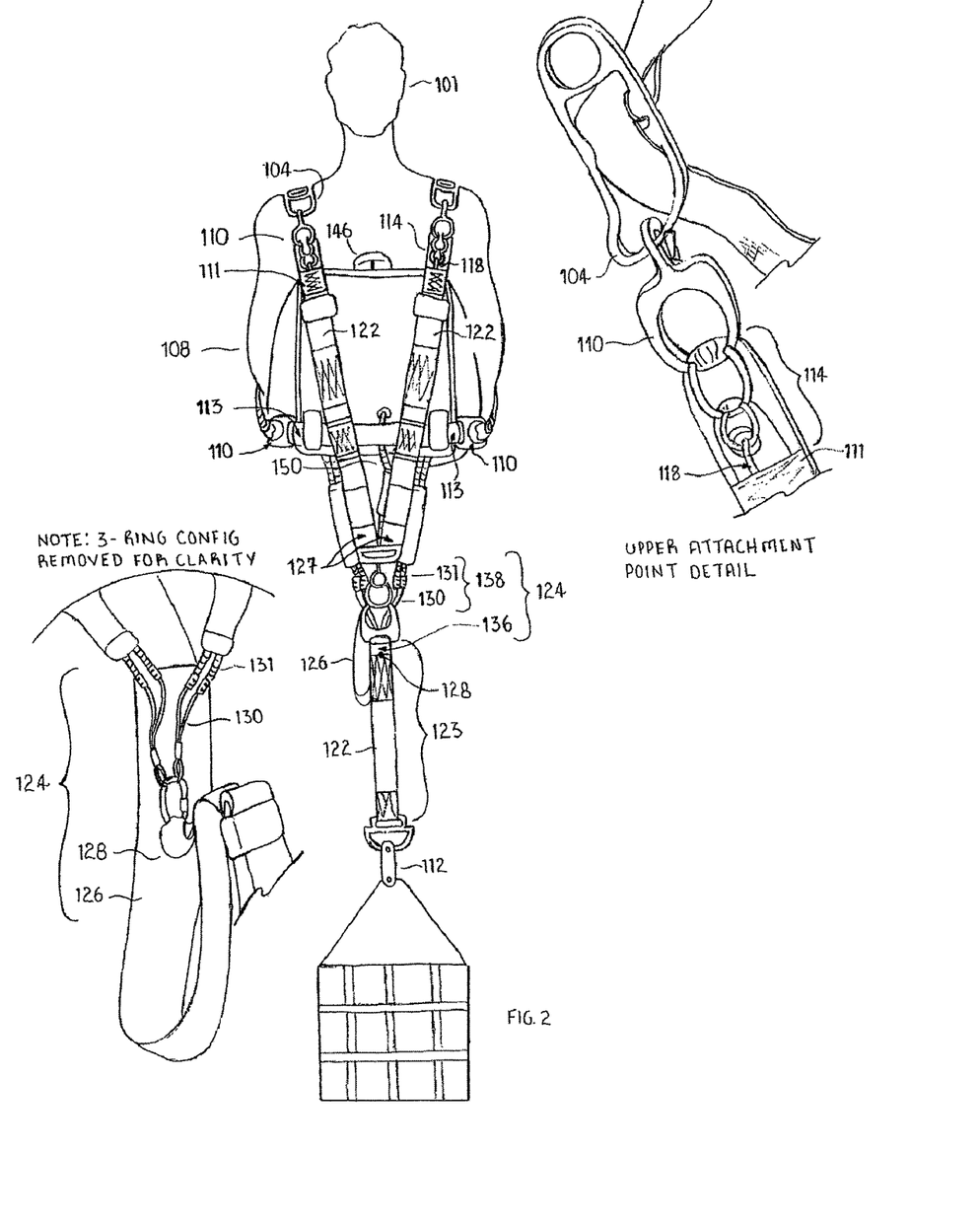
FIG. 2 shows a front view of the load assist release system of FIG. 1.

As seen in FIG. 2, which is a front view of FIG. 1, the cargo bundle 108 of this embodiment includes a bridle 122, which includes bridle upper sections 122, a bridle lower section 123, and a slack loop 126 in between. The bridle upper sections have two bridle upper attachment points 111, and two bridle lower attachment points 113, for connecting the cargo bundle 108 to releasable connectors, which in turn connect to the primary delivery vehicle attachment points 104, 105. In this embodiment the releasable connectors used to connect the bridle attachment points 111, 113 to the tandem parachute attachment points 104, 105, are three-ring release systems that use single ring components 110, and double ring components 114.

The releasable connectors that connect the bridle attachment points 111, 113 to the primary delivery vehicle are not limited to three-ring connectors, however, but could include more or fewer rings, such as a four-ring connector, or a two ring connector etc. Further, any releasable connector that retains a connection until receiving input, such as applied force and/or movement, in response to which it releases, is contemplated. Such applied force and/or movement could be received through required operative (i.e. signals from sensors or automated systems etc) or physical connections to a manual or automatic release system. Variations include, but are not limited to, a lever release mechanism in place of the three-ring release, such as a Wichard Release #2776 produced by Wichard Inc. In such an embodiment, the Wichard Release could releasably connect the cargo bundle 108 to the primary delivery vehicle, where the Wichard Release could be connected to the primary delivery vehicle, and could engage single ring components 110 integrated into bridle attachment points 111, 113, and cables 130 or other elongated members could operate the lever found on the Wichard Release, which releases the cargo bundle 108 from the Wichard Release upon a release of the first stage release link.

The cargo bundle of this embodiment further includes bridle upper sections 122, which are lengths of material between the bridle attachment points 111, 113 and the first stage release 124; a cargo bundle parachute container 120 attached to bridle upper sections 122 and containing a cargo parachute (not shown); a first stage release link 124 (described in more detail below) connected between a first stage release link upper attachment point 127 and a cable attachment point 128; a slack loop 126 between first stage release link upper attachment point 127 and cable attachment point 128, the length of the slack loop being greater than the length of the first stage release link by enough to permit the cable attachment point to effect the release of the releasable connectors when the first stage release is released; a cable attachment point 128 in a bridle lower section 123 which, in this embodiment, is the point at the intersection of the first stage release link 124 and slack loop 126 at the bridle lower section 123, and which is a point that, when cargo is suspended from the primary delivery vehicle, moves away from the primary delivery vehicle with the cargo in response to a release of the first stage release; elongated flexible members, typically coated cables, but not limited to coated cables, serving as the cargo bundle release cables 130, which are routed from a first end connected to the cable attachment point 128 in the bridle lower section 123 through bundle release cable housings 131, to a second end that engages the release loops 118 (only uppers shown); and the bridle lower section 123. Cargo 132 is shown attached to the bridle lower section 123 at the cargo attachment point 112.

Figure 3:
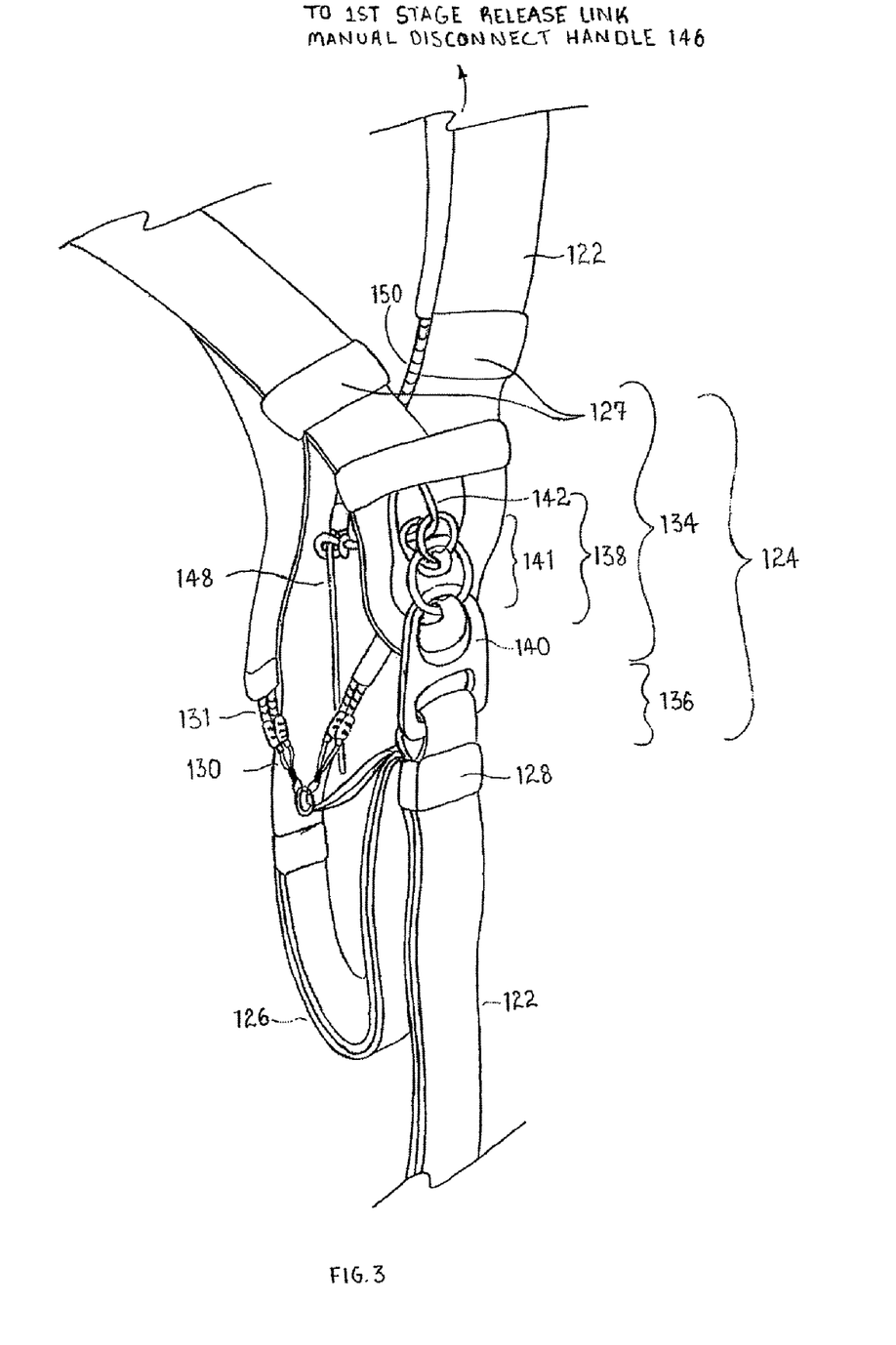
FIG. 3 shows the first stage releasable connection of the load assist release system of FIG. 1 comprising a three-ring release.

The first stage release link 124 is shown in further detail in FIG. 3. It an embodiment it includes a first stage release link upper section 134, a first stage release link lower section 136, and a first stage release link releasable connection, which, in this embodiment, is a three-ring release system designated as the first stage release link three-ring release system 138. The first stage release link three-ring release system includes a first stage release link single ring component 140 and a first stage release link double ring component 141, plus a first stage release link release loop 142, and a first stage release link manual disconnect system 144 including a first stage release link manual disconnect handle 146 (FIG. 2), a first stage release link manual disconnect elongated flexible member 148, and a first stage release link manual disconnect cable housing 150.

The first stage release link 124 shown in this embodiment incorporates a three-ring release system, but is not limited to incorporating a three-ring release system; it can incorporate components of any release that retains a connection until receiving input such as applied force and/or movement, which would be received through required operative (i.e. signals from sensors or automated systems etc) or physical connections to a manual or automatic release system, in response to which it releases. Other example include ring release systems with more then three-rings, or less than three-rings, as well as the Wichard Release #2776 discussed above. Such an embodiment is described in detail below, and shown in FIGS. 8-12. The first stage release link 124 can alternately include a cutting mechanism which severs the first stage release link 124, or a frangible component which simply breaks when forces exceed a certain amount, (as described in more detail below). Cutters can be manually or automatically activated and simply cut through the entirety of the first stage release link 124, or the first stage release link 124 can include a specific component chosen to serve the role of the component to be cut. Cables 130 and 148 need not be only coated cables, ropes or lines etc, but can be any way of conveying force or distance information to their respective releases in order to cause them to release.

Figure 4:
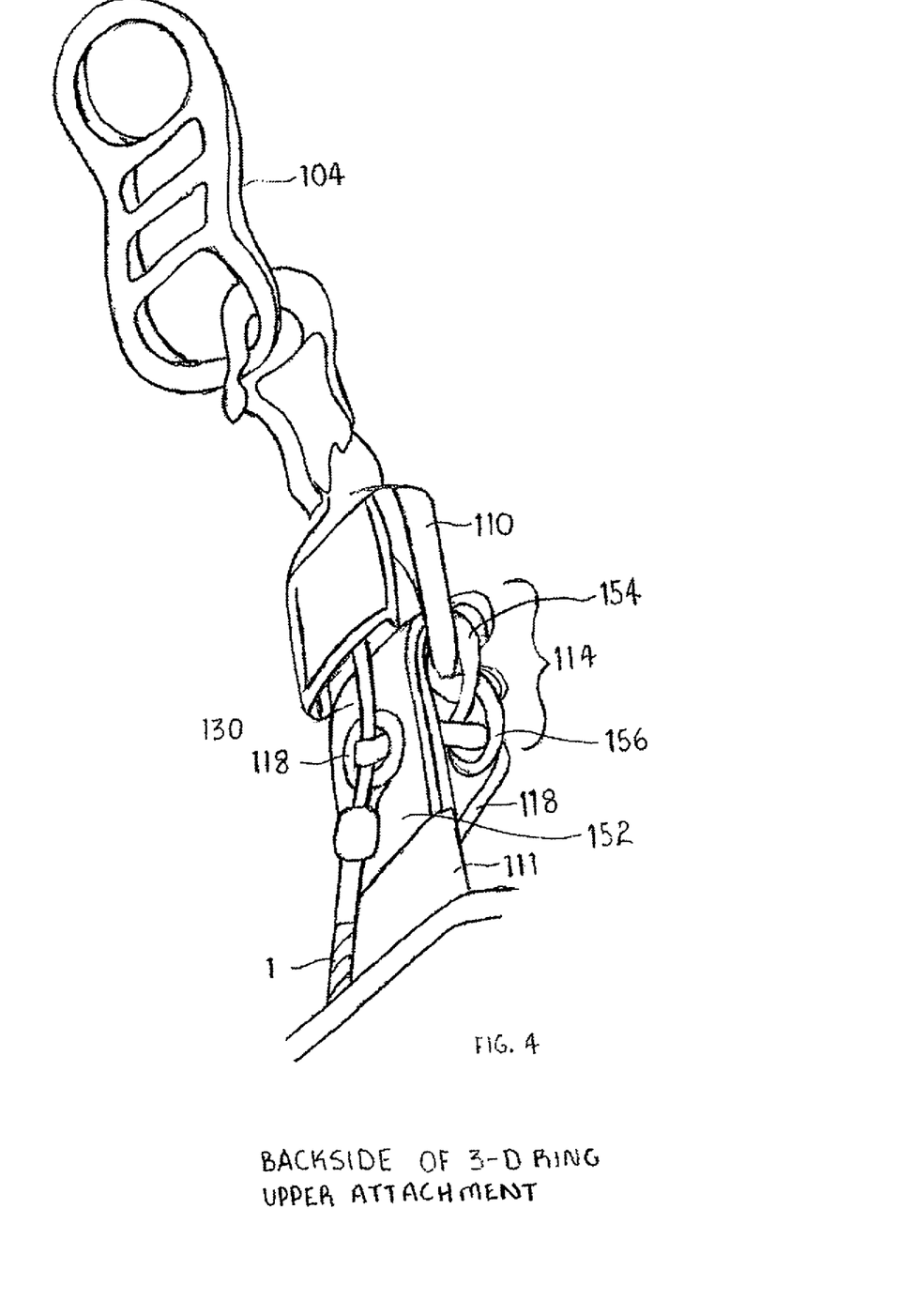
FIG. 4 shows a close-up of the upper releasable connection of the load assist release system of FIG. 1 connected to the upper attachment point of the primary delivery vehicle.

FIG. 4 shows the back side of a bridle upper attachment point 111, a three-ring release system serving as the upper releasable connection, and tandem parachute upper attachment points 104, of an embodiment. The double ring components 114 of the three-ring release systems may be integrated into the bridle upper attachment points 111. Tandem harness upper attachment points 104 may exist as loops. The single ring component 110 may clip to the tandem harness upper attachment points 104, or the tandem harness upper attachment points 104 may themselves serve as the single ring component of the three-ring release system.

Three-ring release systems are known to those in the art, and may include a double ring component 114, which in an embodiment may be attached to the bridle upper attachment point 111; a single ring component 110, which in an embodiment may be attached to the tandem parachute upper attachment points 104; a release loop 118, that is anchored at one end to a double ring component strap 152, and is routed through the double ring component smaller ring 156, through the double ring component strap 152; and a cable, which in an embodiment may be cargo bundle release cable 130, which pass through release loop 118. Three-ring releases are assembled by inserting the double ring component larger ring 154 through the single ring component 110, then inserting the double ring component smaller ring 156 through the double ring component larger ring 154, routing release loop 118 through the double ring component smaller ring 156, through the double ring component strap 152, and then inserting a cable, such as cargo bundle release cable 130, into the loop.

When assembled and under load, the cargo bundle release cable 130, which is somewhat rigid, keeps release loop 118 from being pulled through the double ring component strap 152. Release loop 118 holds the double ring component smaller ring 156 in place, which is looped through the double ring component larger ring 154. This, in turn, holds the double ring component larger ring 154 in place. Since the double ring component larger ring 154 is looped through the other half of the connector, the single ring component 110, the connection is maintained so long as the cargo bundle release cable 130 remains in its position through release loop 118. To release the connection, i.e. to separate the double ring component 114 from the single ring component 110, the release loop 118 must be freed. Typically, in order to free release loop 118, cargo bundle release cable 130 is extracted from release loop 118, though it is also possible to cut release loop 118, using automatically or manually actuated cutters. Once cargo bundle release cable 130 is extracted from release loop 118, the double ring component smaller ring 156 is freed, which frees up the double ring component larger ring 154. With nothing to hold the double ring component larger ring 154 in place, double ring component larger ring 154 pulls through the other half of the connector, the single ring component 110, and the connection is broken. i.e. the three-ring releasable connection has been released.

Figure 5:
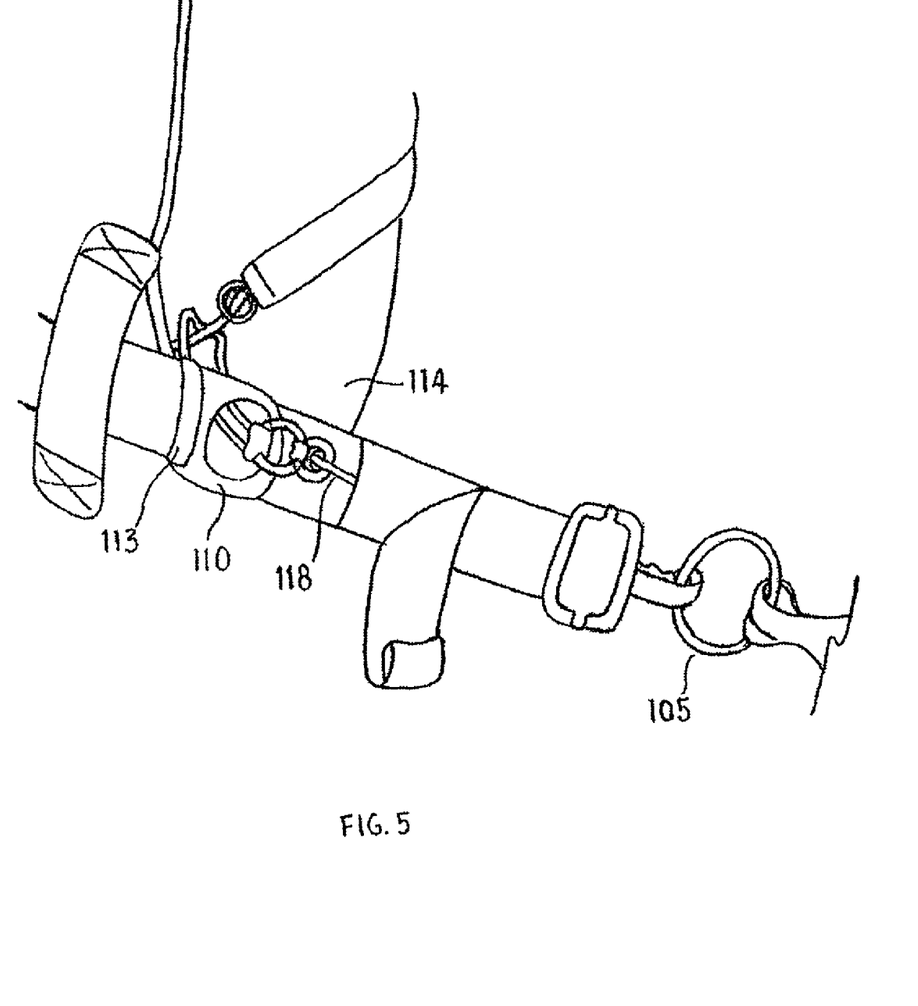
FIG. 5 shows a close-up of the lower releasable connection of the load assist release system of FIG. 1 connected to the lower attachment point of the primary delivery vehicle (not shown).

FIG. 5, shows a lower releasable connection between the tandem harness lower attachment point 105, and the bridle lower attachment points 113. In an embodiment the lower three-ring releasable connection may be configured differently than the upper releasable connection. In the lower releasable connection, single ring components 110 may be integrated into the bridle lower attachment points 113, and the double ring components 114 may be connected to the tandem harness lower attachment points 105. (FIG. 5).

The first stage release link manual disconnect elongated flexible member 148 serves as the cable for the three-ring release used in the first stage release, and is extracted by hand when the operator pulls on the first stage release link manual disconnect handle 146. Cargo bundle release cables 130 serve as the cable for the three-ring releases that secure the cargo bundle 108 to the tandem harness attachment points, 104, 105. They are attached at cable attachment point 128, which is directly tethered to the cargo 132, and as will be explained in further detail below, thus they are extracted by the cargo 132 as cargo 132 pulls away from the parachutist.

In operation, the first stage release link 124 is assembled, cargo 132 is attached to the cargo attachment point 112, and the cargo bundle 108 is attached to the primary delivery vehicle using releasable connectors such as three-ring releases. The cargo bundle 108 and cargo 132 are suspended at their respective suspended distances from the primary delivery vehicle, for example, from an aircraft in flight, or a parachutist wearing a tandem parachute harness. While suspended, by nature of its weight and shape relative to the primary delivery vehicle, cargo 132 will tend to want to pull away from the primary delivery vehicle. The desire to separate from the primary delivery vehicle creates force, which is carried through the bridle lower section 123, through the first stage release link 124, through the bridle upper sections 122, to the bridle attachment points 111,113, and the releasable connectors, all of which are bearing the forces created by the cargo 132. This leaves slack loop 126 slack, because it bears none of the load generated by the cargo when the first stage release link 124 is assembled and bearing the load.

The force required to release any releasable connectors, the release force, is typically determined by and proportional to the force generated by the load. In the embodiment of the invention where the primary delivery vehicle is a parachutist wearing a tandem parachute harness and the first stage release is manually activated, the release force to release the first stage connector must be provided by the parachutist. In contrast, the release force to release the releasable connectors attaching the cargo bundle to the primary delivery vehicle is provided by the cargo, which is the opposite of the prior art. Hence, force reducing releasable connectors, such as three-ring releases, are used throughout an embodiment of the load assisted release system, as can be force multiplying mechanisms. Force reduction releasable connectors are contemplated by themselves in all locations. Force multiplying mechanisms may or may not be incorporated into the first stage release manual disconnect system. Releasable connectors that do not reduce forces are also contemplated when used as first stage releasable connectors, because they could be used in conjunction with force multiplying mechanisms, to enable the parachutist to provide enough force to effect the release of the first stage releasable connector. In the case of a force reducing connector, such as the three-ring release used in the described embodiment, the release force required is at least enough to overcome the frictional force between the release loop of the double ring component, the housing for the elongated member, and the elongated member, such as a cable, that is routed through the housing and engages the release loop. Other releasable connectors are contemplated and they will require different release forces, the amount of the release force being determined by the specific configuration of the releasable connector.

Accordingly, the cargo bundle release system of an embodiment incorporates a releasing of the first stage release three-ring release system 138, which disconnects the cargo 132 from the first stage release link upper section 134, freeing the cargo to move away from the primary delivery vehicle, which, in turn, results in a release of the whole cargo bundle 108, which includes the cargo bundle parachute container 120 and cargo bundle parachute (not shown), from the primary delivery vehicle. Releasing the first stage release, which, in turn, disconnects the cargo from the first stage release link upper section 134, is a step required prior to the release of the cargo bundle from the primary delivery vehicle. For clarity, the term "first stage release" as used herein refers to a releasing of the first stage release three-ring release system 138, or whichever releasable connectors is being used, which frees the cargo 132 from the first stage release link upper section 134, while the term "release" refers to the release of the whole cargo bundle 108 from the primary delivery vehicle.

In the embodiment shown in FIG. 1, in order to release the cargo bundle 108, the parachutist simply pulls on the first stage release link manual disconnect handle 146. Pulling on the first stage release link manual disconnect handle 146 pulls the first stage release link manual disconnect cable 148, and when the first stage release link manual disconnect cable 148 is moved a first predetermined distance, the first stage release link manual disconnect cable 148 is extracted from and thereby releases the first stage release link release loop 142, which in turn releases the first stage release link double ring component 141 from the first stage release link single ring component 140. At this point the first stage release link 124 is released.

Once the first stage release link is released, the force generated by the cargo's 132 desire to separate from the primary delivery vehicle, which was previously opposed by the first stage release link 124, is now unopposed, and thus cargo 132 begins to pull away from the primary delivery vehicle, gaining momentum. Cable attachment point 128 also begins to pull away from the primary delivery vehicle along with cargo 132, because there is no slack between the cargo 132 and cable attachment point 128. As cable attachment point 128 pulls away from the primary delivery vehicle, the cargo bundle release cables 130, which are attached to cable attachment point 128, also pull away from the primary delivery vehicle. Cargo bundle release cables 130 are routed through the release loops 118 of the cargo bundle three-ring release system, and serve to secure the release loop 118, which, in turn, secures the double ring component 114 to the single ring component 110. When assembled the cargo bundle release cables are at a set position with respect to the release loops 118. The cargo bundle release cables must move a second predetermined distance from the assembled position before they are extracted from the release loops 118. The cargo bundle release cables are attached to cable attachment point 128, so cable attachment point 128 must move the second predetermined distance away from the parachutist before cargo bundle release cables 130 will be extracted from release loop 118 of the three-ring releasable connectors. Accordingly, there must be enough slack in the slack loop when assembled to permit cable attachment point 128 to move away from the parachutist at least the second predetermined distance before the slack loop is fully stretched out. Preferably there is enough slack in the slack loop to allow an amount of movement of cable attachment point 128 more than the second predetermined distance, to ensure proper operation.

When the cargo 132, cable attachment point 128, and cargo bundle release cables 130, move away from the primary delivery vehicle the second predetermined distance, the cargo bundle release cables 130 are extracted from the release loops 118 of the cargo bundle three-ring release system. This releases the double ring components 114 from the single ring components 110, thereby releasing the connection between the cargo bundle 108 and the primary delivery vehicle. The cargo bundle release cables 130 each exit their respective release loops 118 at approximately the same time, i.e. close enough in time to permit the cargo bundle 108 to separate from the primary delivery vehicle without changing the configuration of the cargo delivery system and any causing dynamic instabilities. At this point the release is complete; and the cargo bundle and primary delivery vehicle are entirely separate from each other.

Under stable and typical conditions, when the primary delivery vehicle is a parachutist wearing a tandem parachute harness, the force generated in the bridle sections 122, 123, and the first stage release link 124, is proportional to, and equal to or less than, the weight of the cargo. Thus, friction on the first stage release link manual disconnect cable 148 is relatively low, and the release system of the prior art generally sufficed. However, as is the case with parachute operations, highly dynamic and unpredicted conditions can and do occur. An example condition includes a scenario where the primary delivery vehicle, i.e. the parachutist wearing a tandem parachute harness, has deployed the parachutist's parachute, and the parachutist's parachute experiences a malfunction that results in, for example, "spinning." In this scenario the parachutist's parachute and the cargo are spinning around opposite each other, and the parachutist is attached to the spinning system in between the parachutist's parachute and the cargo.

The release system of the prior art requires the parachutist to release the four cables securing the cargo bundle to the tandem harness. However, the forces generated by a rapidly rotating system are much greater than when the cargo and primary delivery vehicle are falling as intended. As such, the forces on the release system of the prior art are much greater, and may require much greater pulling forces by the parachutist.

The inventive release of an embodiment of the current system, however, uses a first stage release link which uses a more efficient, single, straight, short cable to effect the disconnect of the cargo. Disconnecting the first stage release allows the cargo to travel away from the primary delivery vehicle for a short time virtually unrestrained, during which time it builds momentum. The inertia of the cargo during this period of travel is used to pull the cargo bundle release cables 130, which in turn releases the cargo bundle 108 from the primary delivery vehicle. Therefore, in this innovative improvement, increased forces in the first stage release link 124 that result from unstable operating conditions are the same forces subsequently used upon the releasing of first stage release link 124 to pull the cargo bundle release cables 130 from the release loops 118. Thus, as a result of this improvement, as instability and dynamic forces increase, the efficiency of the cargo bundle release will also increase, which is the opposite of what happens in the release system of the prior art. Further, due to the high forces involved, even if the cargo bundle release cables 130 do not release at exactly the same time, they will certainly still release, thus reducing the concerns related to release timing, which is another advantage of this improvement.

Figure 6:
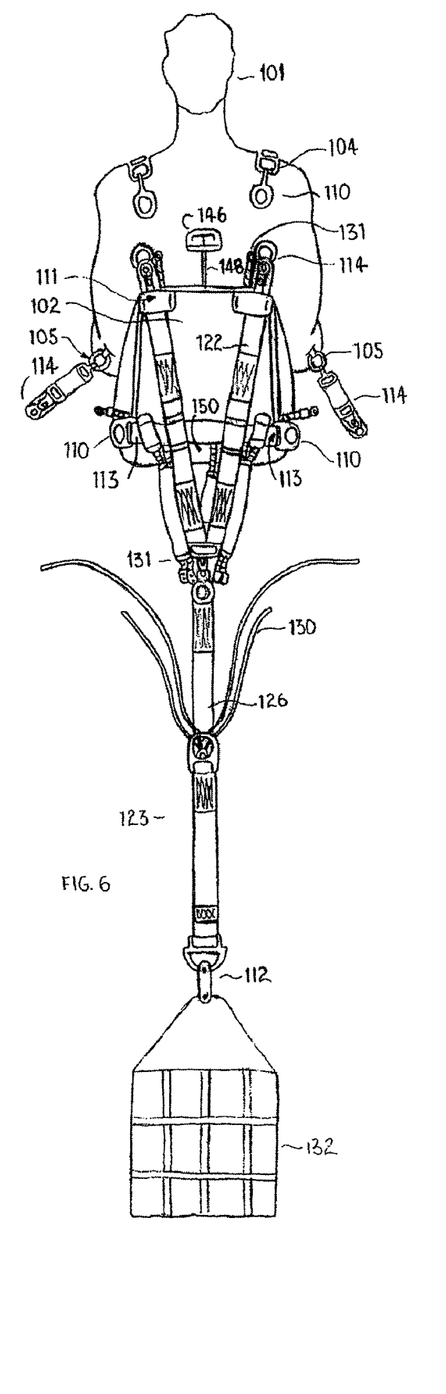
FIG. 6 shows a front view of a released load assist release system of FIG. 1.
Figure 7:
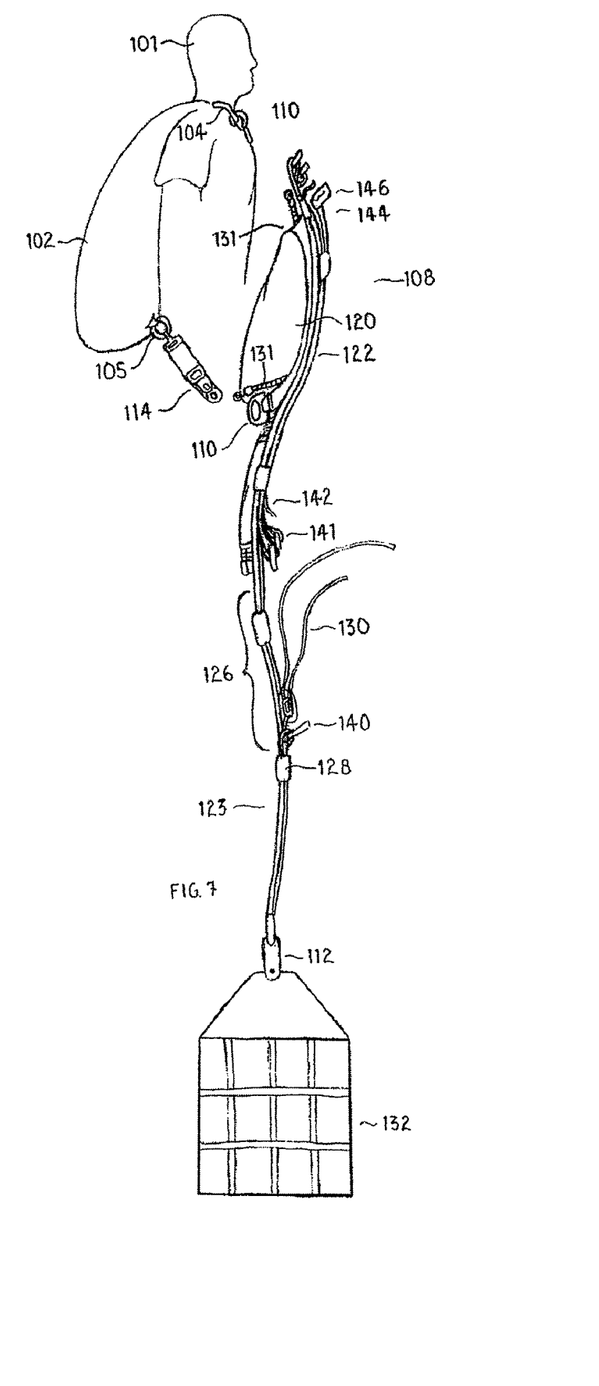
FIG. 7 shows a side view of the released load assisted release system of FIG. 6.

FIGS. 6 and 7 show the system of FIG. 1 after the first stage release link manual disconnect handle 146 has been pulled, the slack loop 126 has reached full stretch, the cargo bundle release cables 130 have been pulled from the release loops 118, and the cargo bundle 108 has thus been completely released from the primary delivery vehicle. For clarity, cargo bundle release cables 130 are shown as though they pulled completely out of their respective bundle release cable housings 131, though this may not happen, and whether they pull from their bundle release cable housings 131 does not affect the release in any way. At this point, cargo bundle 108 and the parachutists are completely free of each other, and cargo bundle 108 is free to fall away from the parachutist under its own weight.

Figure 8:
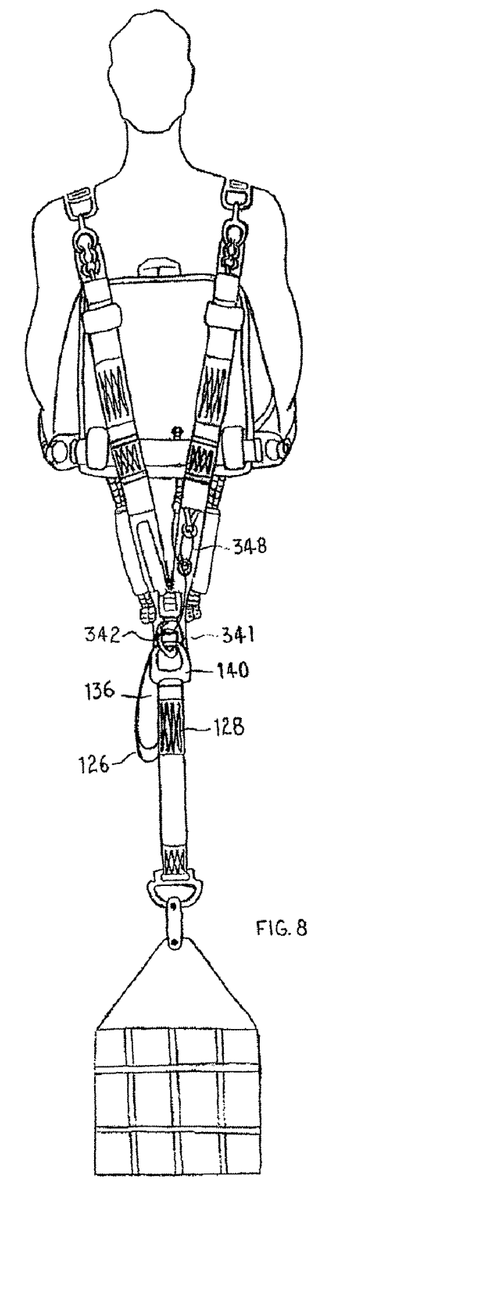
FIG. 8 shows a front view of an assembled load assist release system of FIG. 1, where the first stage release includes a Wichard Release #2776, and the first stage release manual disconnect includes a force multiplier.
Figure 9:
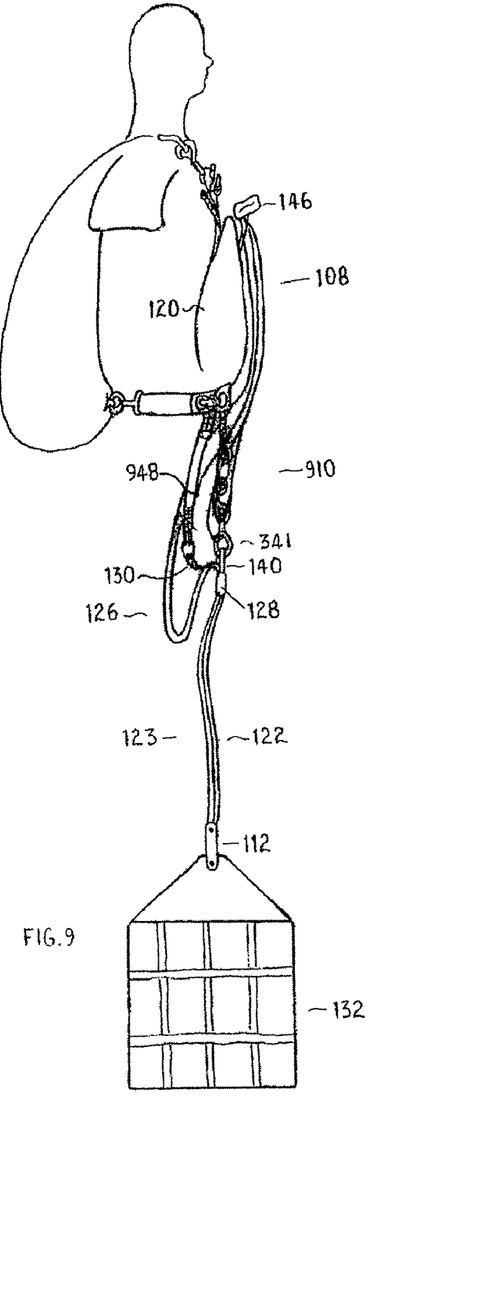
FIG. 9 shows a side view of the load assisted release system of FIG. 8.
Figure 10:
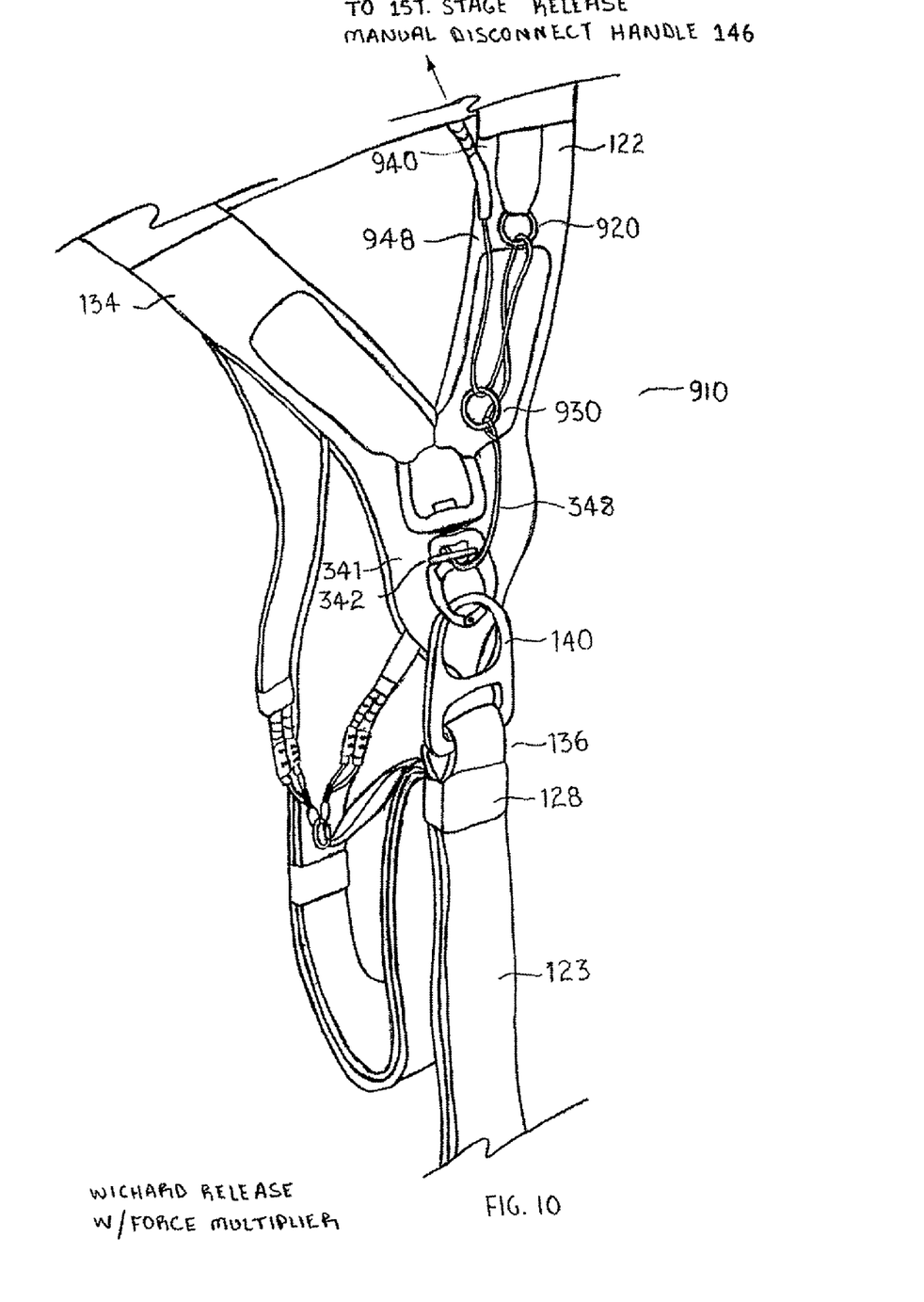
FIG. 10 shows the assembled first stage releasable connection of the load assist release system of FIG. 8, comprising the Wichard Release #2776 and the first stage release manual disconnect force multiplier.

FIGS. 8 and 9 show an embodiment of the system of FIG. 1, where the first stage release link double ring component 141 and the first stage release link release loop 142 have been replaced with a Wichard Release #2776 system 341, and first stage release link manual disconnect cable 148 has been replaced with a more flexible member, such as the likes of string, cord, or rope 348. As shown in FIG. 10, when the first stage release link manual disconnect handle 146 is pulled, rope 348 pulls up on lever 342, which opens Wichard Release #2776, and thereby releases the first stage release link single ring component 140 from Wichard Release #2776. This releasing of the first stage release link 124 then releases the cargo bundle 108 from the primary delivery vehicle, fully releasing the cargo bundle 108 from the parachutist, as previously discussed.

Figure 11:
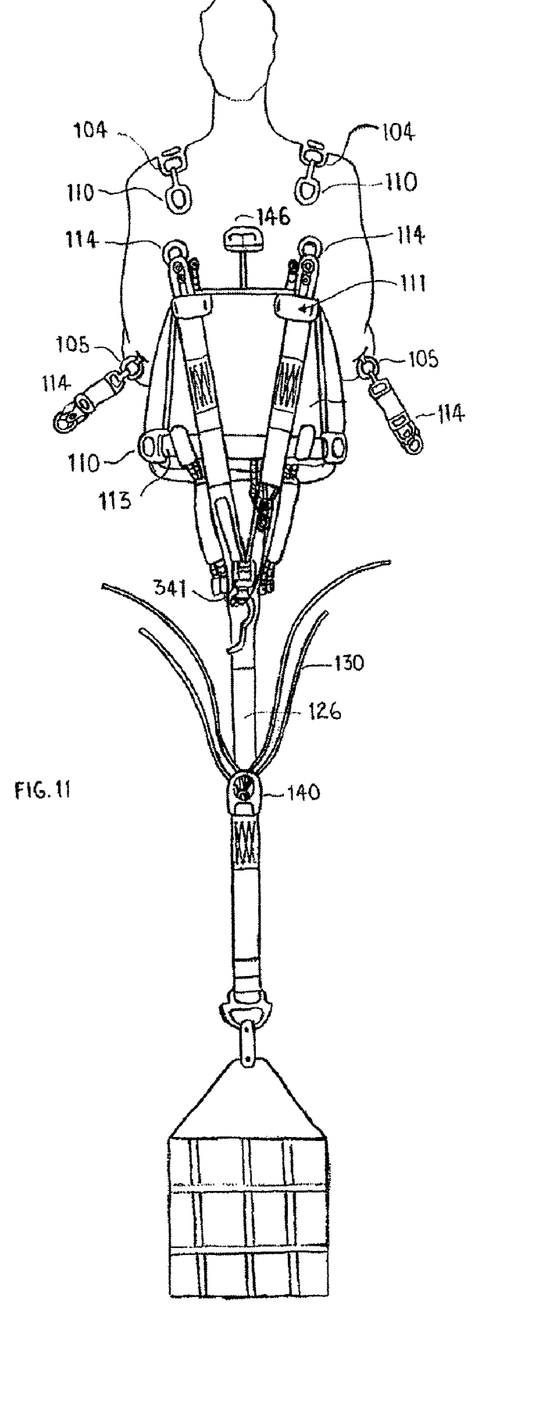
FIG. 11 shows a front view of a released load assist release system of FIG. 8.
Figure 12:
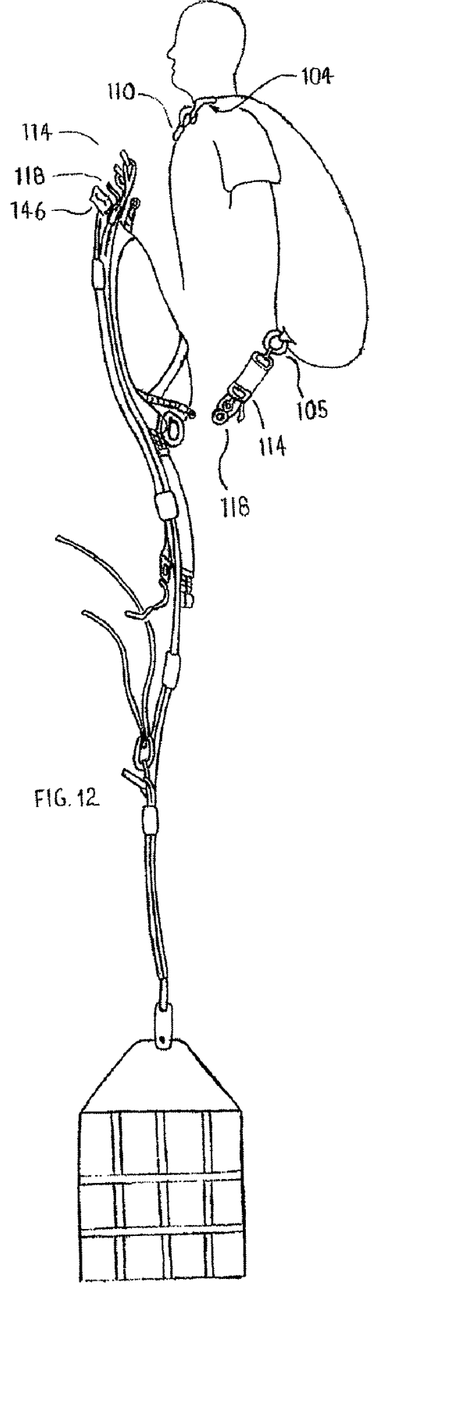
FIG. 12 shows a side view of the released load assisted release system of FIG. 8.

FIGS. 11 and 12 show the system of FIG. 8 after the first stage release link manual disconnect handle 146 has been pulled, the slack loop 126 has reached full stretch, the cargo bundle release cables 130 have been pulled from the release loops 118, and the cargo bundle 108 has thus been completely released from the primary delivery vehicle. As above, for clarity, cargo bundle release cables 130 are shown as though they pulled completely out of their respective bundle release cable housings 131, though this may not happen, and whether they pull from their bundle release cable housings 131 does not affect the release in any way. At this point, cargo bundle 108 and the parachutists are completely free of each other, and cargo bundle 108 is free to fall away from the parachutist under its own weight.

Further, the first stage release link manual disconnect can contain a force multiplying mechanism effective to output a force at the first stage release link releasable connector's release mechanism greater than the force input at the first stage release link manual disconnect handle. Any mechanism that produces forces at the operable end of a release mechanism that are greater than those applied at the manual disconnect handle end is contemplated.

Referring back to FIG. 10, a two-ring, three-to-one force magnification system 910 may be employed in the first stage release link manual disconnect system 144. The discussed first stage release loop 142 release mechanism, i.e. the first stage release link manual disconnect handle 146, would also work with a force magnifying mechanism. Others ways of releasing first stage release link release loop 142 that have not been discussed, i.e. other than a manual handle, could also be employed, due to the greater amount of force that would be available at the releasable connector's release mechanism because of the force multiplying mechanism. In particular, release systems that would require greater pulling force than a parachutist might normally be able to provide, but may have some other advantage, such as increased reliability, or the ability to increase the maximum load limit, could be employed with a force multiplying mechanism such, such as the one discussed, or any other acceptable force multiplying mechanism.

Pulling on first stage release link manual disconnect handle 146 pulls on a rope 948 or other similar component. Anchored ring 920 is anchored to the bridle upper section 122 at an anchor point 940. Rope 948 is routed from first stage release link manual disconnect handle 146 to the first stage release link release mechanism, during which routing it first passes by anchored ring 920, then through second ring 930, then it returns to and passes through anchored ring 920, and then it returns to second ring 930 where it attaches to second ring 930, as well as passes on to the release mechanism of the first stage release releasable connector, to which it connects in such a manner as to be able to effect a release of the releasable connector when the first stage release link manual disconnect handle 146 is pulled. This configuration results in three sections of rope 948 pulling on the second ring 930, which in turn connects to and operates the first stage release disconnect mechanism chosen, providing a force magnification of, in this embodiment, three to one. Other amounts of force magnification can be used as needed.

Figure 13:
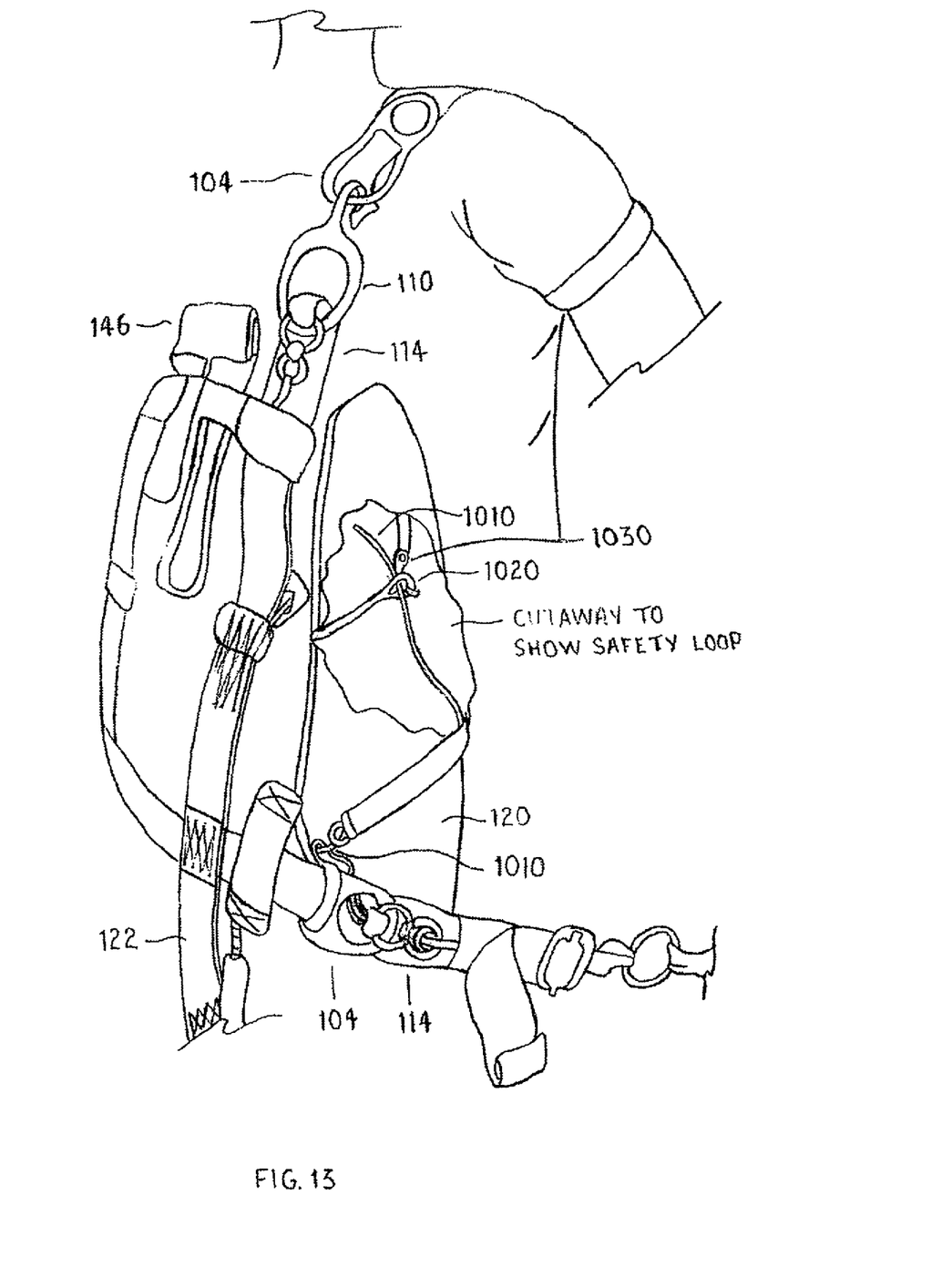
FIG. 13 shows a cutaway view of the cargo parachute and the cargo parachute safety.
Figure 14:
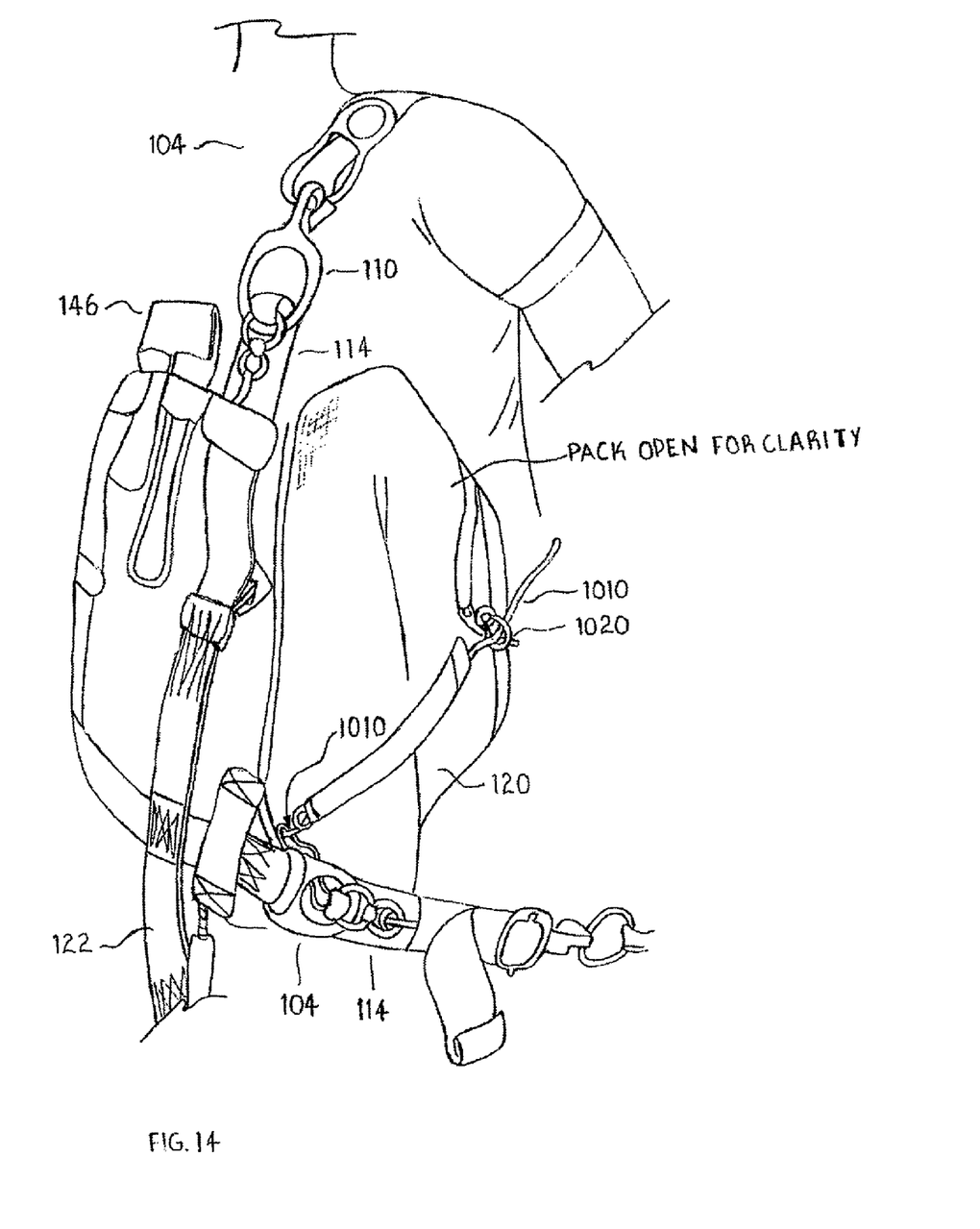
FIG. 14 shows a view of the cargo parachute with the cover opened and the cargo parachute safety.

Finally, as can be seen in FIGS. 13 and 14, there is a cargo parachute safety cable 1010. The cargo parachute (not shown) is held in place with a cargo parachute retaining loop 1020, and a release pin 1030, as are many parachutes. When the release pin 1030 is pulled, the cargo parachute is free to deploy. The cargo parachute safety cable 1010 of an embodiment also engages the cargo parachute retaining loop 1020. The cargo parachute safety loop 1020 also holds the cargo parachute (not shown) inside the cargo bundle parachute container 120, and is intended to prevent the cargo parachute (not shown) from deploying while the cargo bundle 108 is still attached to the primary delivery vehicle, in the event the release pin 1030 works loose.

The cargo parachute safety cable 1010 in the present invention is no longer connected to the first stage release link manual disconnect as it was in the prior art. It is instead connected to the primary delivery vehicle. Once the primary delivery vehicle and the cargo bundle separate, cargo parachute safety cable 1010 is extracted from the cargo parachute safety loop 1020. This ensures that if the cargo bundle separates from the primary delivery vehicle for any reason, the cargo parachute will not be prevented from deploying from the cargo parachute container by the cargo parachute safety cable.

Further embodiments could include a first stage release link 124 that is a single piece of material that acts as a frangible connection, which breaks when the load generated by the cargo exceeds a predetermined limit. First stage release link 124 could be a uniform piece of material with a known tensile strength, which is chosen such that it will break under predetermined conditions. First stage release link 124 could also be a piece of material with an engineered seem integral to the first stage release link 124, which is chosen such that it will break under predetermined conditions. The first stage release link 124 could include a single piece of material and cutter that would cut the first stage release link releasing component. The cutter could be manually activated with first stage release link manual disconnect handle 146 and communication path, or automatically activated when internal sensors, such as accelerometers, or strain gauges, that sense forces that exceed predetermined limits.

In another embodiment the first stage release link could further be configured such that the first stage release link release loop 142 as shown in FIG. 3 also passes through a cutter head of an automatically activated cutter device, such as those known in the art to cut under predetermined conditions. Automatic cutters of this type include a Cypress 2 manufactured by Airtec GmbH, or other similar devices. Sensors 850 can also be employed to sense forces and activate a cutting mechanism once the forces exceed a predetermined amount, or sense other parameters including, but not limited to altitude and fall rate, and activate when predetermined conditions are met. The cutter could also respond to input from the operator, such as in response to pulling on the first stage release link manual disconnect handle 146.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A load assisted release system for releasably connecting cargo to an aerial primary delivery vehicle, comprising:
   a releasable connector; and
   a bridle, comprising:
      a bridle attachment point connecting the bridle to the releasable connector;
      a slack loop comprising a slack loop upper end and a slack loop lower end, wherein the slack loop lower end is closer to a bridle cargo end;
      a first stage release link directly connecting the slack loop upper end to the slack loop lower end, wherein a slack loop length is greater than a first stage release link length by at least a second predetermined distance; and
      a responsive point in the bridle at or below the slack loop lower end that is responsive to a releasing of the first stage release link and in operable communication with the releasable connector to cause the releasable connector to release the bridle from the primary delivery vehicle once the first stage release link is released and the responsive point has moved away from the slack loop upper end the second predetermined distance,
   wherein the releasable connector is configured to connect the bridle to the primary delivery vehicle; and
   wherein a release force required to move the responsive point in the bridle the second predetermined distance and thereby release the releasable connector is generated by the cargo as it moves away from the primary delivery vehicle.

2. The load assisted release system of claim 1, wherein the releasable connector comprises a force reduction mechanism.

3. The load assisted release system of claim 1, wherein the releasable connector comprises a plurality of releasable connectors that release at approximately the same time.

4. The load assisted release system of claim 2, wherein the bridle attachment point comprises a plurality of bridle attachment points, the releasable connector for each bridle attachment point comprises a three-ring release system, and wherein a releasing component for each of the three-ring release systems comprises an elongated flexible member, and each elongated flexible member is attached to the responsive point of the bridle such that when the responsive point moves the second predetermined distance from the slack loop upper end each of the elongated flexible members also moves the second predetermined distance, thereby releasing their respective releasable connector.

5. The load assisted release system of claim 1, wherein the first stage release link comprises a force reduction mechanism and a first stage release link manual disconnect configured to release the first stage release link when a first stage release link manual disconnect handle is pulled a first predetermined distance.

6. The load assisted release system of claim 5, wherein the first stage release link comprises a first stage release link lever release mechanism, and wherein the first stage release link manual disconnect handle is attached to a first stage release elongated flexible member which is operatively attached to a first stage release link lever release mechanism releasing component.

7. The load assisted release system of claim 5, wherein the first stage release link comprises a first stage release link three-ring release system and wherein the first stage release link manual disconnect handle is attached to a first stage release link elongated flexible member that is a first stage three-ring release releasing component.

8. The load assisted release system of claim 1, wherein the first stage release link further comprises a first stage release link manual disconnect configured to release the first stage release link when a first stage release link manual disconnect handle is pulled a first predetermined distance, wherein the first stage release link manual disconnect comprises a force multiplier.

9. The load assisted release system of claim 8, wherein the first stage release link manual disconnect comprises a one-to-three, three-ring force multiplier.

10. The load assisted release system of claim 1, wherein the bridle further comprises a cargo parachute container attached to the bridle, and a cargo parachute attached to the bridle and releasably contained within the cargo parachute container, wherein the cargo parachute is held in place with at least a safety cable engaging a cargo parachute retaining loop, and wherein the safety cable is connected to the primary delivery vehicle, and the safety cable engages the cargo parachute retaining loop such that when the bridle is released from the primary delivery vehicle the safety cable is extracted from the cargo parachute retaining loop, thereby freeing the cargo parachute to deploy.

11. A cargo delivery system comprising the bridle of claim 10, wherein the primary delivery vehicle comprises a tandem parachute harness.

12. A load assisted release system for releasably connecting cargo to a primary delivery vehicle comprising:
   a bridle and a releasable connector configured to releasably connect the bridle to the primary delivery vehicle, wherein the releasable connector comprises an elongated member, and the releasable connector releases the bridle from the primary delivery vehicle when the elongated member is moved axially a second predetermined amount, and wherein the elongated member is in communication with the cargo such that movement of the cargo away from the primary delivery vehicle the second predetermined amount beyond a suspended distance moves the elongated member the second predetermined amount, thereby releasing the bridle from the primary delivery vehicle, wherein a release force to move the elongated member is generated by the movement of the cargo as the cargo moves away from the primary delivery vehicle, and wherein the cargo moves away from the primary delivery vehicle in response to a manually activated first stage release; and a cargo parachute container attached to the bridle, and a cargo parachute attached to the bridle and releasably contained within the cargo parachute container, wherein the cargo parachute is held in place with at least a safety cable engaging a cargo parachute retaining loop, and wherein the safety cable is connected to the primary delivery vehicle, and the safety cable engages the cargo parachute retaining loop, such that when the bridle is released from the primary delivery vehicle the safety cable is extracted from the cargo parachute retaining loop, thereby freeing the cargo parachute to deploy.

13. A cargo delivery system comprising the load assisted release system of claim 12, wherein the primary delivery vehicle comprises a tandem parachute harness.

14. A method for releasably transporting cargo using an aerial primary delivery vehicle, comprising:

connecting a bridle to the primary delivery vehicle at a bridle primary delivery vehicle end using releasable bridle connectors that release when a releasable bridle connector releasing component is moved a second predetermined distance;

creating a slack loop in the bridle by releasably connecting a slack loop upper end to a slack loop lower end, wherein the slack loop lower end is closer to a bridle cargo end, leaving enough slack when assembled to permit the slack loop lower end, upon release, to move at least the second predetermined distance away from the slack loop upper end before the slack loop is fully stretched, wherein the first stage connector releases when a first stage releasable connector releasing component is moved a first predetermined distance;

suspending cargo from the bridle cargo end that is opposite the bridle primary delivery vehicle end; and connecting the bridle connector releasing component to the slack loop lower end.

15. The method of claim 14, further comprising releasing the cargo by pulling, the first predetermined distance, a first stage manual release handle that is attached to the first stage releasable connector releasing component, wherein as the cargo subsequently pulls away from the primary delivery vehicle, the slack loop lower end moves with the cargo away from the slack loop upper end, moving bridle connector releasing components, and wherein once the slack loop lower end moves the second predetermined distance away from the slack loop upper end, the releasable bridle connectors release, thereby separating the bridle and cargo from the primary delivery vehicle.

16. The method of claim 15, further comprising removing a cargo parachute retaining loop safety cable from a cargo parachute retaining loop, 17. The method of claim 15, further comprising deploying a cargo parachute after releasing the cargo.

* * * * *